(12) United States Patent
Cockerham et al.

(10) Patent No.: US 10,670,254 B2
(45) Date of Patent: Jun. 2, 2020

(54) ELECTRICAL BUSWAY LIGHTING SYSTEM

(71) Applicant: Critical Components, Inc., Atlanta, GA (US)

(72) Inventors: Scott Cockerham, Atlanta, GA (US); Adam McWilliams, Atlanta, GA (US)

(73) Assignee: Critical Components, Inc., Atlanta, GA (US)

( * ) Notice: Subject to any disclaimer, the term of this patent is extended or adjusted under 35 U.S.C. 154(b) by 0 days.

(21) Appl. No.: 16/394,800

(22) Filed: Apr. 25, 2019

(65) Prior Publication Data

US 2019/0331331 A1    Oct. 31, 2019

Related U.S. Application Data

(60) Provisional application No. 62/662,515, filed on Apr. 25, 2018.

(51) Int. Cl.
| | |
|---|---|
| *F21V 23/06* | (2006.01) |
| *H02G 5/06* | (2006.01) |
| *F21V 21/02* | (2006.01) |
| *H01R 25/14* | (2006.01) |
| *H02G 3/04* | (2006.01) |

(52) U.S. Cl.
CPC ............ *F21V 23/06* (2013.01); *F21V 21/025* (2013.01); *H01R 25/145* (2013.01); *H02G 3/0437* (2013.01); *H02G 5/06* (2013.01)

(58) Field of Classification Search
CPC .... F21V 19/0085; F21V 19/042; F21V 21/35; F21V 23/06; F21V 21/025; F21V 23/003; H02G 5/06; H02G 5/005; H02G 3/0437; F21S 8/068; F21S 8/04; H05B 37/0254; H05B 47/18; F21Y 2115/10
See application file for complete search history.

(56) References Cited

U.S. PATENT DOCUMENTS

| | | | | |
|---|---|---|---|---|
| 3,384,856 | A * | 5/1968 | Fisher | H02G 5/08 |
| | | | | 439/213 |
| 3,488,621 | A * | 1/1970 | Stevens | H02G 5/08 |
| | | | | 439/114 |
| 6,180,885 | B1 * | 1/2001 | Goldman | H02G 5/06 |
| | | | | 174/68.2 |
| 9,677,746 | B2 * | 6/2017 | Ramirez | F21V 19/0085 |
| 9,719,673 | B2 * | 8/2017 | Geisler | H05K 7/1485 |
| 10,209,727 | B2 * | 2/2019 | Chapel | H02B 1/04 |
| 2018/0224104 | A1 * | 8/2018 | Bernard | F21V 21/35 |

* cited by examiner

*Primary Examiner* — Haissa Philogene
(74) *Attorney, Agent, or Firm* — Fish & Richardson P.C.

(57) ABSTRACT

A busway system, including an electrical busway section having a length, the electrical busway section having first and second opposing sides, the electrical busway section including one or more busbars between the first and second sides and extending along the length of the electrical busway section; a plugin module including a plug head, the plug head being received within the one or more busbars to couple the plugin module with the electrical busway section; a driver module coupled to the plugin module; and a light source coupled to the electrical busway section and extending along the length of the electrical busway section, and further being electrically regulated by the driver module.

20 Claims, 8 Drawing Sheets

ELECTRICAL BUSWAY LIGHTING SYSTEM

CLAIM OF PRIORITY

This application claims priority under 35 USC § 119(e) to U.S. Patent Application Ser. No. 62/662,515, entitled, "ELECTRICAL BUSWAY SYSTEM" filed on Apr. 25, 2018, the entire contents of which are hereby incorporated by reference.

BACKGROUND

This application is directed to a combination of modular electrical busway systems and lighting sources, e.g., for data centers. Traditionally, data center lighting has been provided either by a grid of recessed lights in a drop ceiling, or high bay lights in an open space. Power distribution, meanwhile, usually has been handled under a raised floor, with individual cables run in the underfloor space to each server rack in the data center. In the last decade, however, overhead busways have become a method of delivering power to each server rack in a data center. While this has reduced the need for raised flooring, it has created conflict with the lighting grids above the server racks.

SUMMARY

Implementations of the present disclosure are generally directed to busway systems. In some implementations, a busway system includes an electrical busway section having a length, the electrical busway section having first and second opposing sides, the electrical busway section including one or more busbars between the first and second sides and extending along the length of the electrical busway section; a plugin module including a plug head, wherein the plug head is configured to be received within the one or more busbars to couple the plugin module with the electrical busway section; a driver module coupled within or to the plugin module; and a light source coupled to the electrical busway section and electrically regulated by the driver module.

These and other implementations may each optionally include one or more of the following features. For instance, the light source can be coupled to the electrical busway section along the first side and extending along the length of the electrical busway section. The light source can be coupled to the electrical busway section by one or more mounting brackets such that the light source is separated from the electrical busway section by a distance d. The light source can be suspended below the electrical busway section.

The system can further include a sensor coupled to the plugin module to adjust a state of the light source. The system can include a secondary power supply coupled to the plugin module. The system can include a bracket providing coupling between the light source and the electrical busway section.

The system may include an additional electrical busway section having an additional length, wherein the light source is coupled to the additional electrical busway section along a side of the additional electrical busway section that coincides with the first side of the electrical busway section and extends along the additional length of the additional electrical busway section. In some implementations, the light source is a LED light source, and the driver module is a LED driver module.

In some implementations, a busway system includes a first and a second electrical busway section each having a length, the sections having first and second opposing sides, each section including one or more busbars between the first and second sides and extending along the length of the section; a plugin module including a plug head, the plug head being received within the one or more busbars of the first electrical busway section to couple the plugin module with the first and the second electrical busway sections; a driver module coupled to the plugin module; and a light source coupled to the first and the second electrical busway sections along the first side and extending along at least a portion of the lengths of the first and second electrical busway sections, and being electrically regulated by the driver module.

These and other implementations may each optionally include one or more of the following features. For instance, the system can further include a sensor coupled to the plugin module to adjust a state of the light source. The system can include a secondary power supply coupled to the plugin module. The system can include brackets mounted to each of the electrical busway sections, the brackets providing coupling between the electrical busway sections and the light source. The light source can be a LED light source, and the driver module is a LED driver module.

In some implementations, a busway system includes an electrical busway section having a length, the section having first and second opposing sides, the section including one or more busbars between the first and second sides and extending along the length of the electrical busway section; a plugin module including a plug head, the plug head being received within the one or more busbars to couple the plugin module with the electrical busway section; a LED driver module coupled to the plugin module; a LED light source coupled to the electrical busway, and being electrically regulated by the LED driver module; and a sensor coupled to the plugin module to adjust a state of the LED light source.

These and other implementations may each optionally include one or more of the following features. For instance, the light source can be coupled to the electrical busway section along the first side and extending along the length of the electrical busway section. The busway can include a secondary power supply coupled to the plugin module. The busway can include an additional electrical busway section having an additional length, wherein the LED light source is additionally coupled to the additional electrical busway section along a side of the additional electrical busway section that coincides with the first side of the electrical busway section and extends along the additional length of the additional electrical busway section.

It is appreciated that systems in accordance with the present disclosure can include any combination of the aspects and features described herein. That is, systems in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

Particular implementations of the subject matter described in this specification can be implemented so as to realize one or more of the following advantages. For example, the described integrated system reduces the infrastructure required for support of both busways and lighting, allowing data center operators to more efficiently light the data center. The data center can receive greater direct lighting while concurrently using less power, increasing efficiency, productivity, and safety. For example, the described systems minimize, or eliminate, multiple lighting distribution panels, reduces the requirement of hanging support structures, lowers installation and operating costs of the data center, increases ease of maintenance of the data center, and provides improved (direct) lighting in such data centers.

BRIEF DESCRIPTION OF DRAWINGS

Like reference symbols in the various drawings indicate like elements.

DETAILED DESCRIPTION

Implementations of the present disclosure are directed to a busway system including a light source coupled to electrical busway sections of the busway system. More particularly, the busway system includes at least one or more electrical busway sections, with busbars positioned within the busway section and extending along a length of the electrical busway section. In some examples, the busbars include channel busbars. In some implementations, the busway system further includes a plugin module that is coupled to the electrical busway section through a paddle head that is received by the busbars (e.g., the plugin module is "installed" along the length of the electrical busway section). In some examples, the plugin module engages with the busway section through an open channel, fixed ports, or other methods to facilitate providing power to a driver module or other equipment/loads. A light source (e.g., linear LED light) is coupled to the electrical busway section along the length of the electrical busway section, and is electrically regulated by a driver module (e.g., LED driver module) that is coupled within or to the plugin module.

Figure 1A:
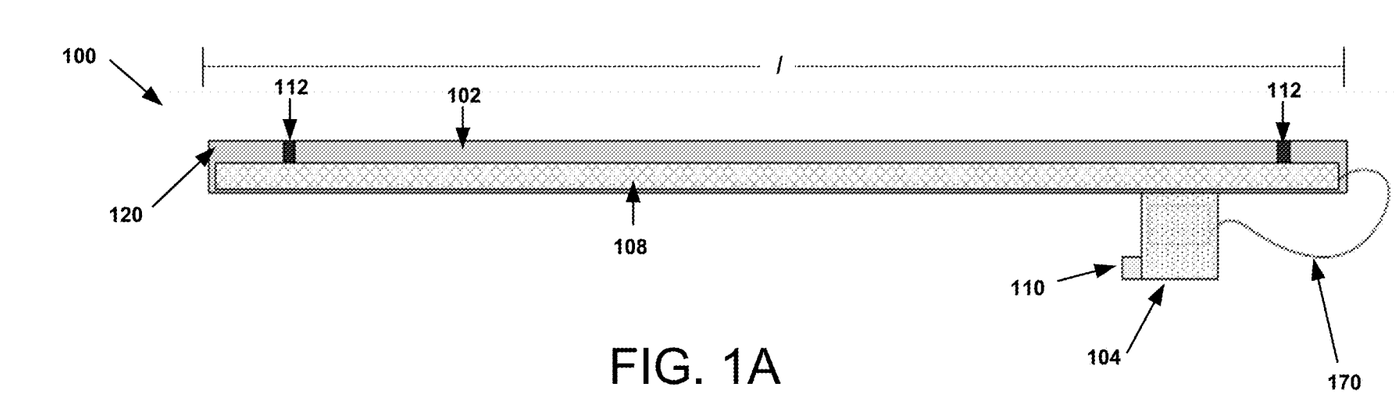
FIGS. 1A-1B depict an example busway system.
Figure 1B:
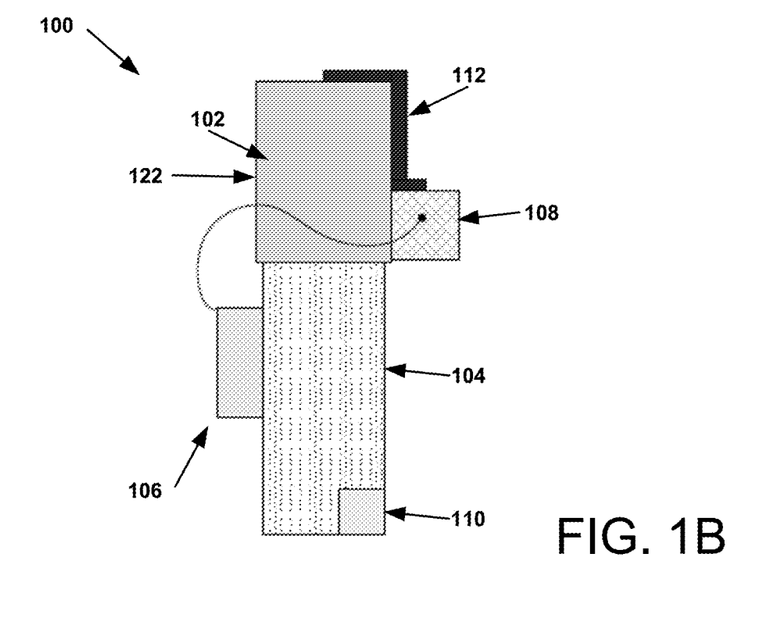

FIG. 1A depicts a front view of an example busway system 100, and FIG. 1B depicts a side view of the system 100 in accordance with implementations of the present disclosure. In some implementations, the busway system 100 includes an electrical busway section 102, a plugin module 104, a driver module 106, an LED light source 108, a sensor 110, mounting bracket(s) 112, and an electrical connection 170. The system 100 includes a plurality of mounting brackets 112.

Figure 2:
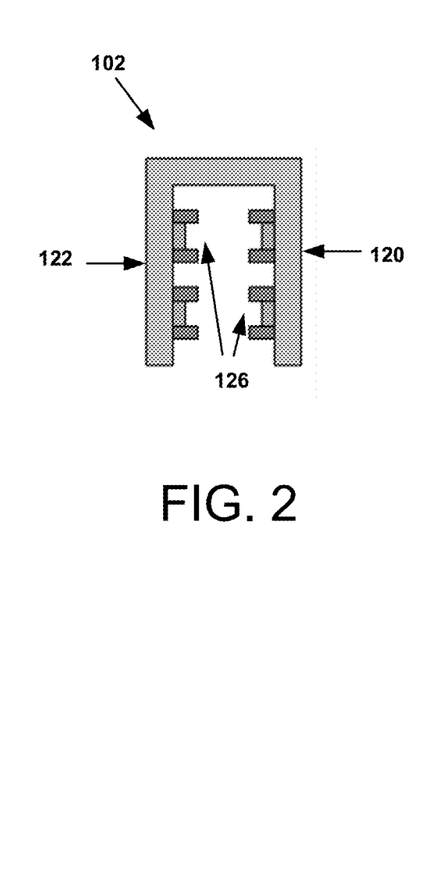
FIG. 2 depicts an example electrical busway section of the busway system of FIGS. 1A-1B.

The electrical busway section 102 has a length l, and further has a first side 120 and a second side 122. The first side 120 is positioned opposite to the second side 122 along the length l. As shown in FIG. 2, the electrical busway section 102 includes channel busbars 126 between the first side 120, and the second side 122. The electrical busway section 102 can include any appropriate number of channel busbars 126 arranged in any appropriate configuration, and can include any appropriate type of busbars. Further, the channel busbars 126 can extend along the length l of the electrical busway section 102. In some embodiments, the busbars 126 extends along a portion of the length l of the electrical busway section 102. In some implementations, a portion of the busbars 126 extends along the length l of the electrical busway section 102, and a differing portion of the busbars 126 extends along a portion of the length l of the electrical busway section 102. In some busway examples, internal busbars may be accessed by fixed openings or ports on the bottom or side(s) of the busway or other appropriate means.

Figure 3:
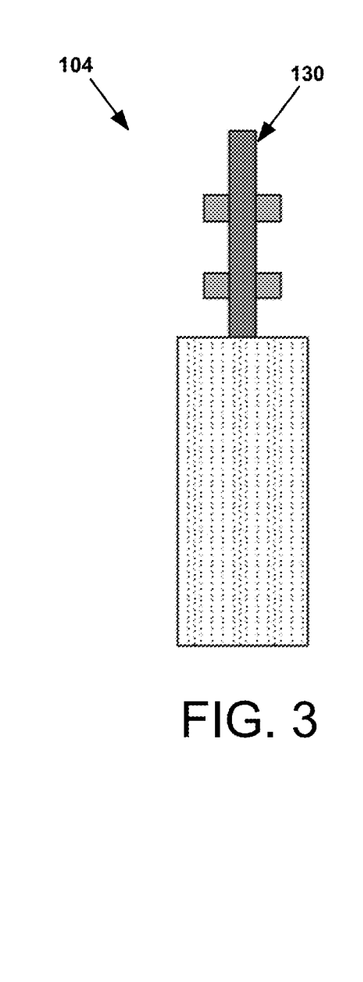
FIG. 3 depicts an example plugin module of the busway system of FIGS. 1A-1B.

Referring to FIG. 3, a detailed view of an example of the plugin module 104 is shown. In some examples, the plugin module 104 includes a plug (or paddle) head 130. The plug head 130 is received within one (or more) of the busbars 126 (e.g., the plug head 130 is received by at least one of the busbars, for example, by sliding, clipping, or pushing the plug head into the busbars 126). When the plug head 130 is received with at least one of the busbars 126, the plug head 130 (or other mechanism as part of the module 104) couples the plugin module 104 to the electrical busway section 102. That is, the plug head 130 is electrically (and physically) coupled to at least one of the busbars 126 to effectuate a coupling between the plugin module 104, and the electrical busway section 102. In some examples, the plug or paddle head may take the forms of stabs or other appropriate means to make electrical and physicals connections to the busway section and/or bus bars. The plugin module 104 further provides electrical coupling to server computing systems (data center), described further herein.

Referring again to FIG. 1B, the light source 108 is coupled to the busway section 102 through the bracket 112 (or brackets 112). The bracket 112 provides (physical) coupling between the light source 108 and the busway section 102. In some examples, the bracket 112 can be modified for different mounting heights and/or distances from the busway section 102, or other positions.

The driver module 106 is coupled within or to the plugin module 104 and electrically regulates the light source 108. The driver module 106 can be an LED driver module. The electrical connection 170 electrically couples the plugin module 104 and driver module 106 to the light source 108.

In some examples, the light source 108 is coupled to the electrical busway section 102 along the first side 120 of the electrical busway section 102, and extends along the length l of the electrical busway section 102. For example, the light source 108 can be physically coupled to the electrical busway section 102, and electrically coupled to the driver module 106, such that the driver module 106 provides electric regulation of the light source 108. In some examples, the light source 108 can be coupled to one or more surfaces of the electrical busway section 102 (e.g., coupled to the first side 120 and the second side 122). In some examples, the light source 108 can include multiple individual light sources 108, each electrically coupled to one another.

In some implementations, the sensor 110 is coupled to the plugin module 104 to adjust a state of the light source 108. That is, the sensor 110 can adjust the light source 108 from a first state (e.g., "on" and providing light) to a second state (e.g., "off" and not providing light), and conversely from the second state to the first state. In some examples, the sensor 110 can be a motion-, ultrasonic- or temperature-sensitive sensor such that upon detection of motion or change of temperature (e.g., by a person) proximate to the sensor 110, the sensor 110 can change the state of the light source 108 to the first state; and conversely, when the sensor 110 does not detect motion or a temperature for a threshold period of time, the sensor can change the state of the light source 108 to the second state.

In some implementations, the busway system 100 includes a second (emergency) power supply (not shown) coupled to the plugin module 104. The second power supply provides secondary (back up) power for the light source 108 (e.g., through the plugin module 104). For example, if the plugin module 104 fails to receive power through ordinary means (e.g., an electrical grid), the second power supply can provide power to the plugin module 104.

Figure 4A:
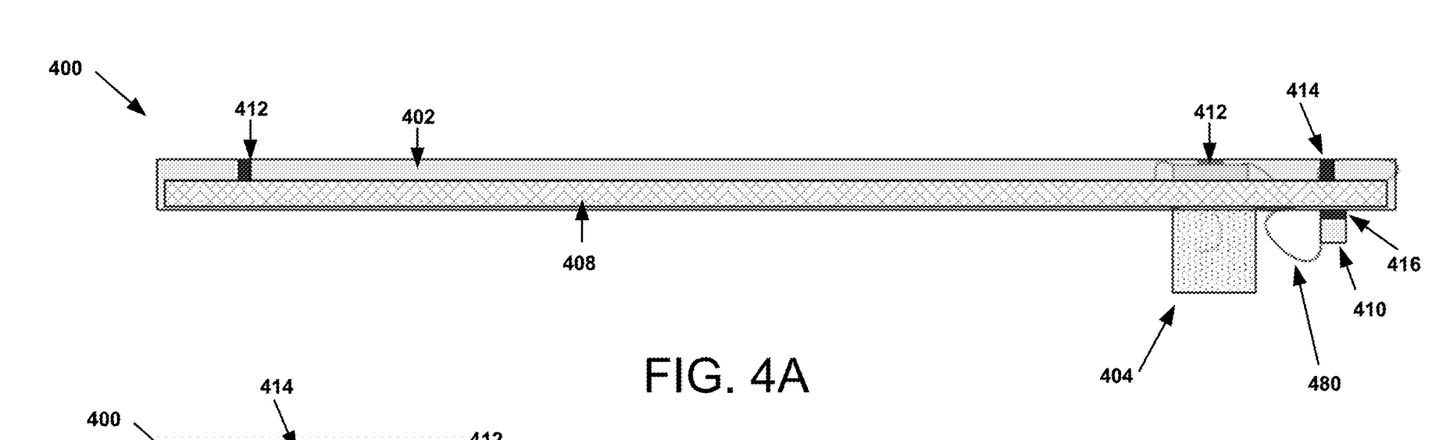
FIGS. 4A-4B depict another example busway system.
Figure 4B:
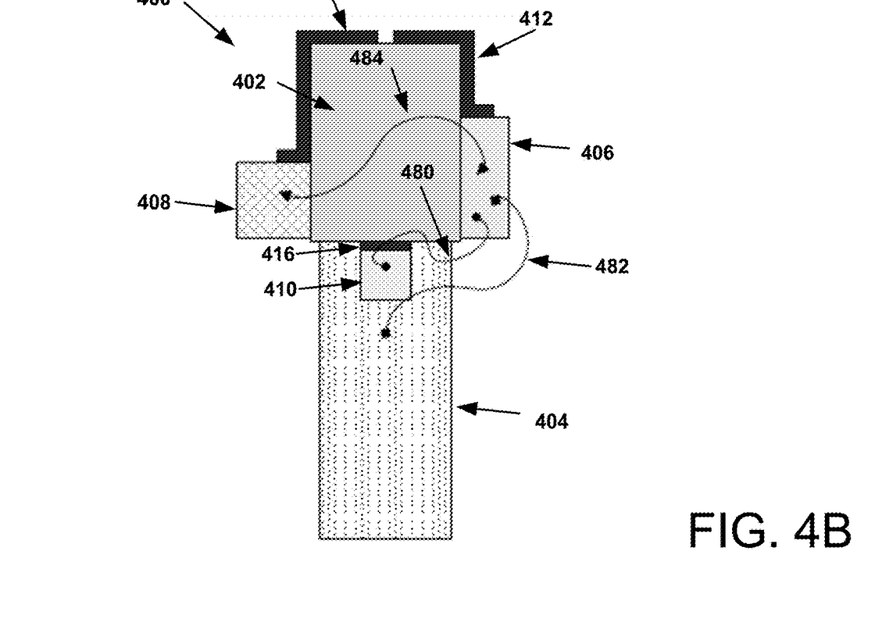

FIG. 4A illustrates an example busway system 400. Some components of system 400 are similar to components of the system 100 of FIG. 1. In the example of FIG. 4, the system 400 includes the same or similar components mounted separately using mounting brackets or other appropriate means. The components can be physically coupled to the electrical busway section(s) or located in other appropriate locations. Specifically, FIG. 4A depicts a front view of an example busway system 400, and FIG. 4B depicts a side view of the system 400 in accordance with implementations of the present disclosure. In some implementations, the busway system 400 includes an electrical busway section 402, a plugin module 404, a driver module 406, a light source 408, a sensor 410, mounting bracket(s) 412, 414, 416, and electrical connections 480, 482, 484.

Referring to FIG. 4B, the light source 408 is coupled to the busway section 402 through the bracket 414. The bracket 414 provides (physical) coupling between the light source 408 and the busway section 402. The driver module 406 is coupled to the busway 402 through the bracket 412, and electrically regulates the light source 408. The electrical connection 484 electrically couples the driver module 406 to the light source 408; and the electrical connection 482 electrically couples the driver module 406 to the plugin module 404. In some examples, the sensor 410 is coupled to the busway 402 through the bracket 416. The electrical connection 480 electrically couples the sensor 410 to the driver module 406.

Figure 5:
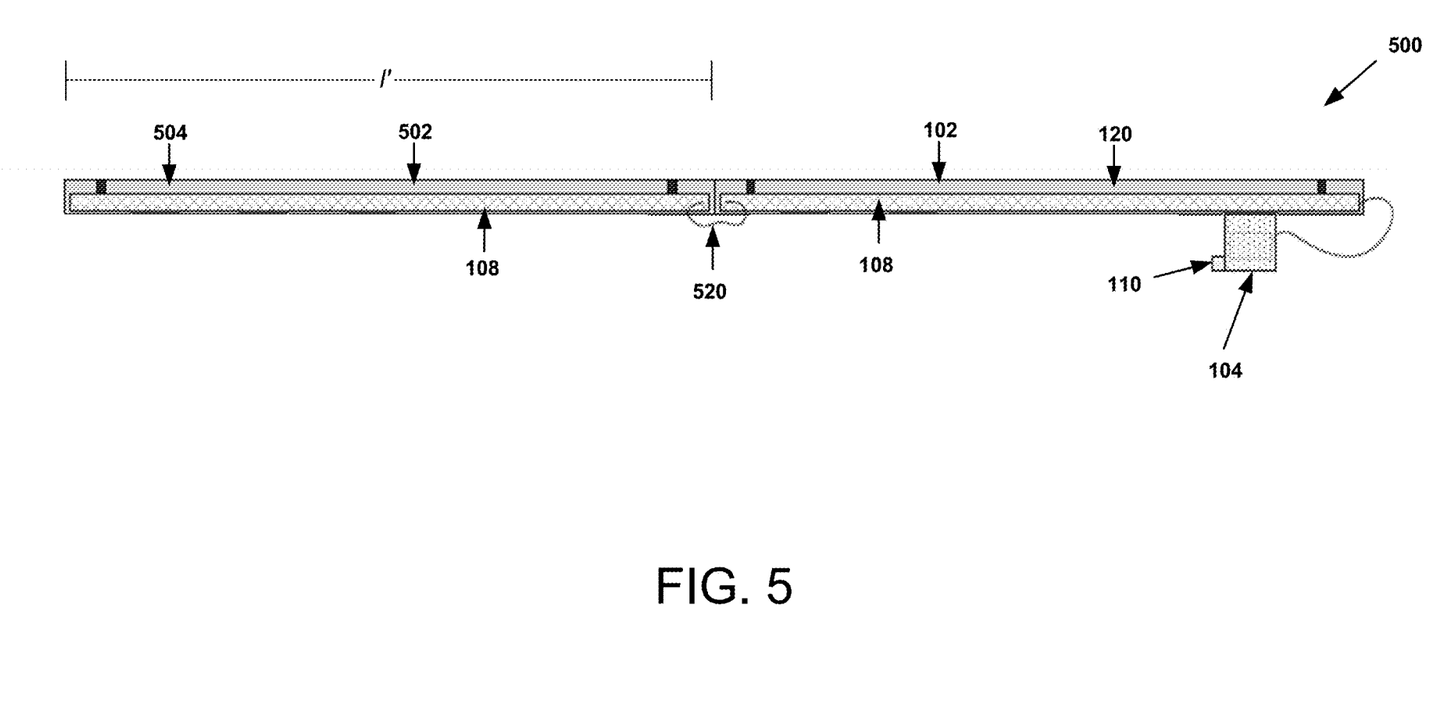
FIG. 5 depicts an example busway system including multiple electrical busway sections.

FIG. 5 illustrates a busway system 500 that include multiple electrical busway sections. The busway system 500 has similar components to components of the system 100 of FIG. 1. In the depicted example, the system 500 includes the system 100 of FIG. 1, and an additional electrical busway section 502 having an additional length l'. The electrical busway section 502 can be similar to the electrical busway section 102 of FIG. 1. The additional electrical busway section 502 can include a third side 504 that is opposed to a fourth side (not shown), similar to the first side 120 and the second side 122, respectively, of FIG. 2.

The electrical busway section 102 is coupled with the additional electrical busway section 502. The busway section 102 can be electrically coupled to the additional busway section 502. The system 500 can further include multiple additional sections (not shown), and/or sections connected to the electrical busway section 102 at various angles (e.g., right angle, or bends). In some examples, the system 500 includes a coupler (not shown) that provides physical and/or electrical coupling between the electrical busway section 102 and the additional section 502.

The light source 108 can be coupled to the additional electrical busway section 502 along the third side 504 of the additional electrical busway section 502. In some examples, the third side 504 coincides with the first side 120 of the electrical busway section 102. The light source 108 can extend along the length l of the electrical busway section 102, and the length l' of the additional electrical busway section 502. The light source 108 can be physically coupled to the electrical busway section 102, and the additional electrical busway section 502. The light source 108 can be a continuous light source, or include multiple light sources that are electrically connected to each other, e.g., by an electrical connection 520. That is, electrical connections such as the electrical connection 520 can provide electrical coupling between multiple sources that together form the light source 108 of the system 500.

In the example embodiment of FIG. 5, the right side light source 108 is connected to a plugin module 104, and the left side light source 108 is electrically coupled to the right side light source through the electrical connection 520. Some busway systems with multiple light source may have multiple plugin modules. For example, if the electrical connection 520 between the two light sources in FIG. 5 is removed, each of those light sources could be connected to a separate plugin module.

Figure 6:
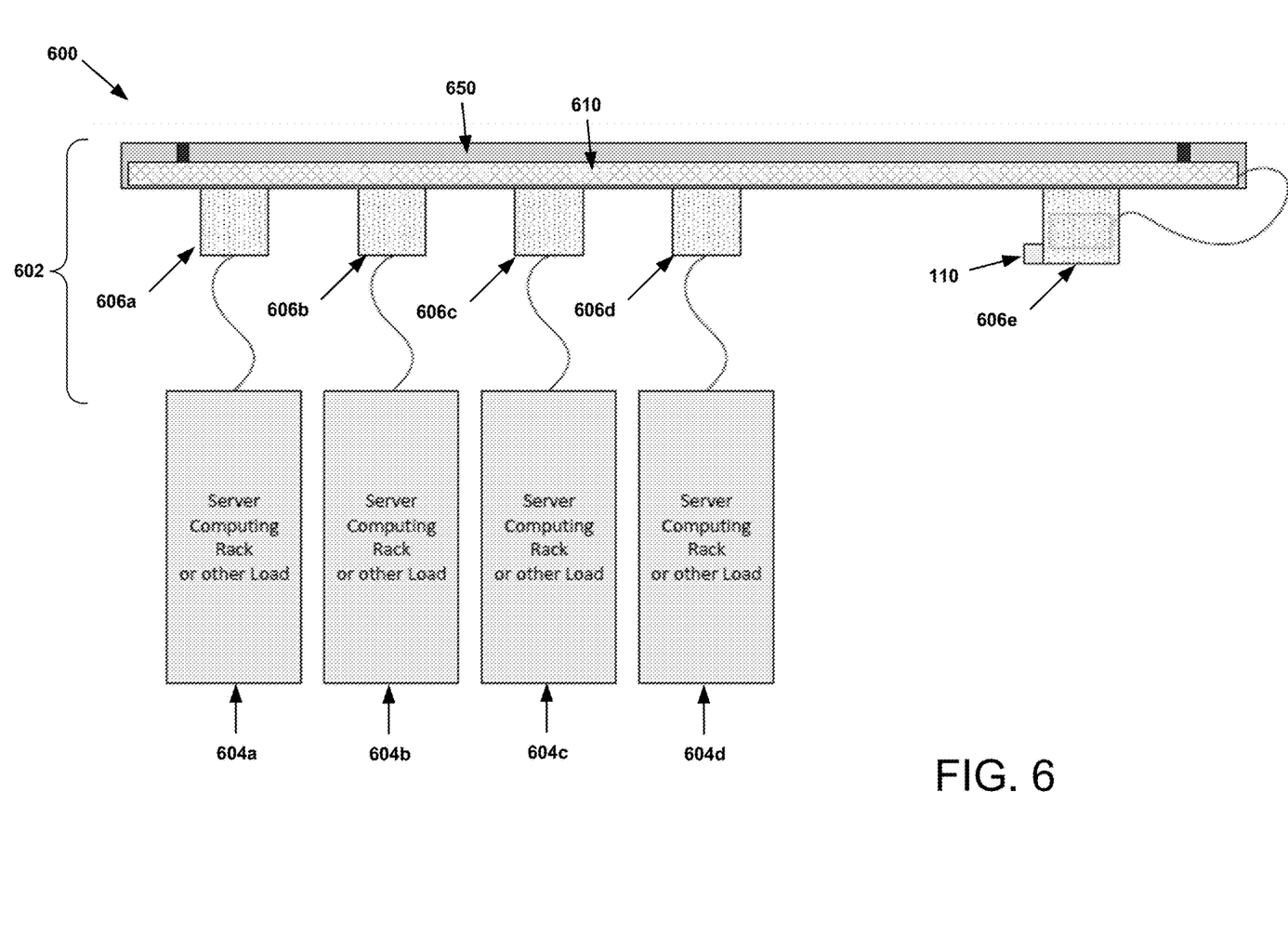
FIG. 6 depicts an example busway system coupled to a data center.

FIG. 6 illustrates a system 600 that includes a busway system 602 and server computing systems 604*a*, 604*b*, 604*c*, 604*d*, (collectively referred to as server computing systems 604, a data center, or other load applications such as manufacturing). The busway system 602 can be similar to any of the busway systems 100, 400, 500. In the depicted example, the system 600 includes the busway system 602 coupled to the server computing systems 604 to provide electrical coupling to the server computing systems 604. As illustrated, the busway system 602 includes five plugin modules 606*a*, 606*b*, 606*c*, 606*d*, 606*e* (collectively referred to as plugin modules 606); however the busway system 602 can include any number of plugin modules (e.g., based on the number of server computing systems 604).

The plugin modules 606 are coupled to an electrical busway section 650, similar to the busway 102 described herein with respect to FIG. 1. The plugin module 606*e* can be similar to the plugin module 104 of FIG. 1. The plugin modules 606*a*, 606*b*, 606*c*, 606*d* are coupled to the server computing systems 604*a*, 604*b*, 604*c*, 604*d*, respectively. For example, the plugin module 606*a* is coupled to a server computing system 604*a* (or can be coupled to any other electrical load). These plugin modules (606*a*, 606*b*, 606*c*, 606*d*) can be, but are not limited to application of an LED lighting portion of the busway system. The busway system 602 includes a light source 610 similar to the light source 108 of FIG. 1, and is coupled to the plugin module 606*e*.

Figure 7:
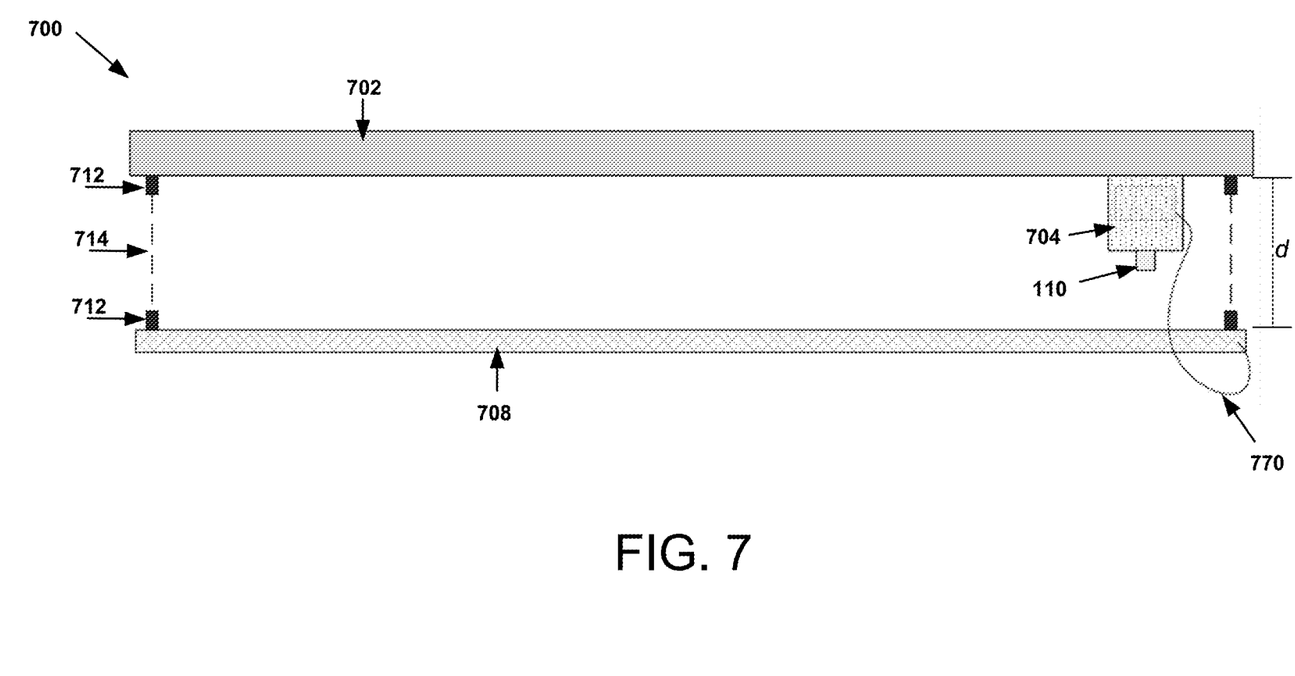
FIG. 7 depicts an example busway system with a suspended light source.

FIG. 7 illustrates a busway system 700 with a suspended light source. The system 700 includes an electrical busway section 702 similar to the busway 102 in FIG. 1. The system includes a light source 708 that is separated from the electrical subway section 702 by a distance d. The light source 708 that is suspended below the electrical busway section 702 via a cable, threaded rod or other similar elongated support elements 714 rather than being mounted directly to the electrical busway section 702. One or more mounting brackets 712 (similar to the brackets 112) provide mechanical connection between the electrical busway section 702 and light source 708. In some examples, the mounting brackets are located on either end of the support elements. In the illustrated example of system 700, the mounting brackets 712 are located substantially close (e.g., within 5% of the light source's length) to the ends of the light source 708. However, the mounting brackets 712 can be located on any part of the light source 708 so long as the mounting elements 712 provide a stable mounting of the light source 708 on the electrical busway section 702.

One or more components of the system 700 are similar to the components of the system 100 in FIG. 1. For example, similar to the electrical connection 170 of the system 100, an electrical connection 770 electrically couples the light source 708 to a plugin module 704.

Figure 8:
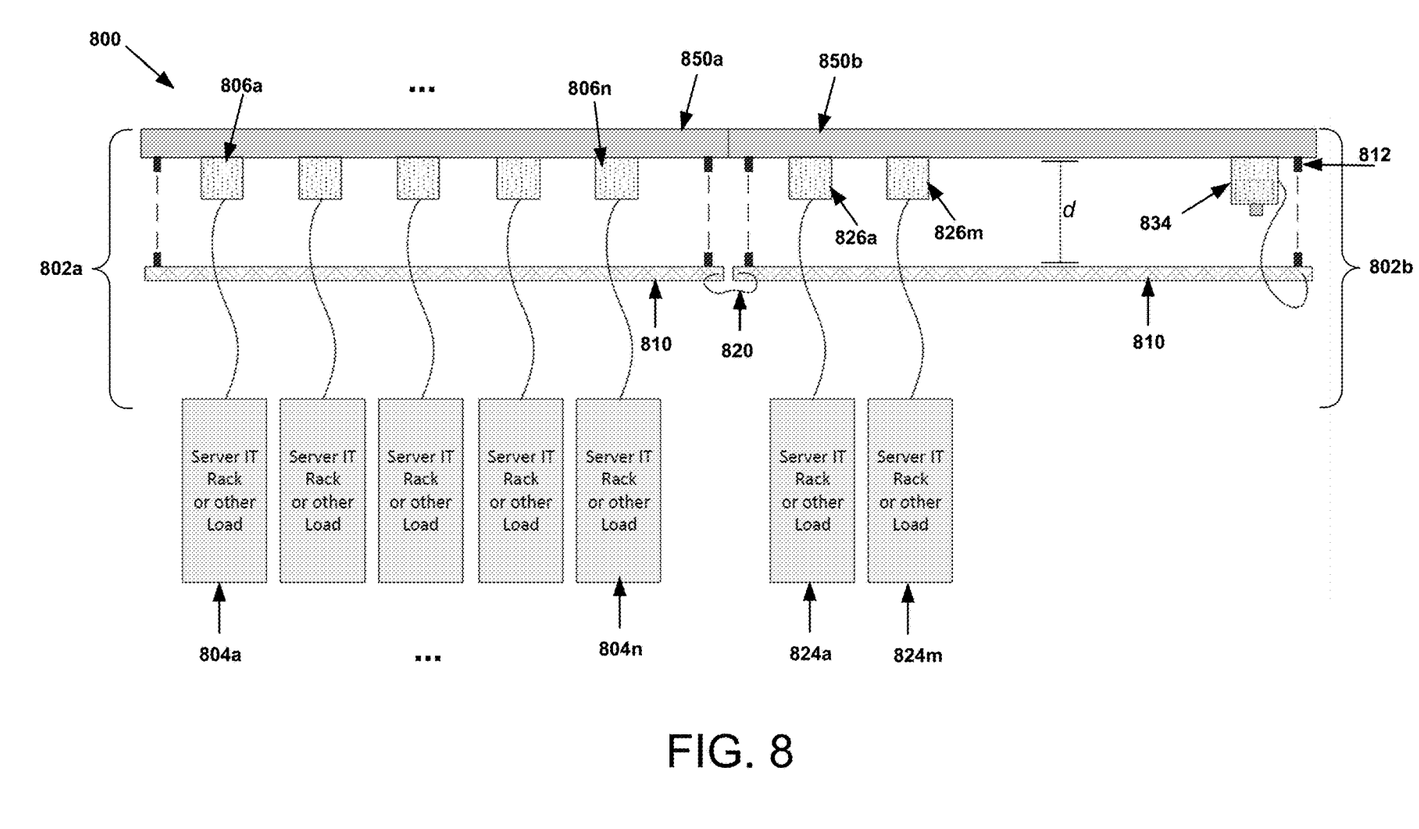
FIG. 8. depicts an example system with a plurality of busway subsystems.

FIG. 8 illustrates an example system 800 with a plurality of busway subsystems 802a and 802b. The subsystem 802a includes an electrical busway section 850a and the busway 802b includes an electrical busway section 850b. Components of the system 800 are similar to the components of the systems in FIGS. 1 through 7. For example, the electrical busway sections 850a and 850b are similar to the electrical busway section 702.

Each of the electrical busway sections 850a and 850b supports one or more respective light sources 810 that are suspended from the respective electrical busway section. For example, the light source 810 is separated from the electrical busway section 850 by distance d. The light sources 810 are coupled to the respective electrical busway section 850a and 850b by one or more mounting brackets 812. The coupling structure and the mounting brackets 812 are similar to the coupling structure of the light source 770 to the electrical busway section 702, and the mounting bracket 712 in FIG. 7, respectively. The light sources of the subsystems 802a and 802b can be electrically connected, for example, by an electrical connector 820. The electrical connector 820 can be similar to the electrical connection 520 in FIG. 5. Examples of the electrical connector 820 are, but are not limited to, cables, wires, etc.

Similar to the system 600 in FIG. 6, each of the busway subsystems 802a and 802b include one or more server computing systems 804a through 804n, and 824a through 824m, respectively. Each of the electrical busway section 850a and 850b can be electrically coupled to one or more of the respective server computing systems 804a-804n and 824a-824m through respective plugin modules 806a-806n and 826a-826m. The plugin modules can be similar to the plugin module 104 system 100.

At least one of the subsystems 802a and 802b includes a plugin module 834. In the illustrated example system 800, the plugin module 834 is mechanically and electrically coupled to the electrical busway section 850b and provides electrical coupling between the electrical busway section 850b and the light source 810. The plugin module 834 can be similar to the plugin module 104 in FIG. 1.

Figure 9A:
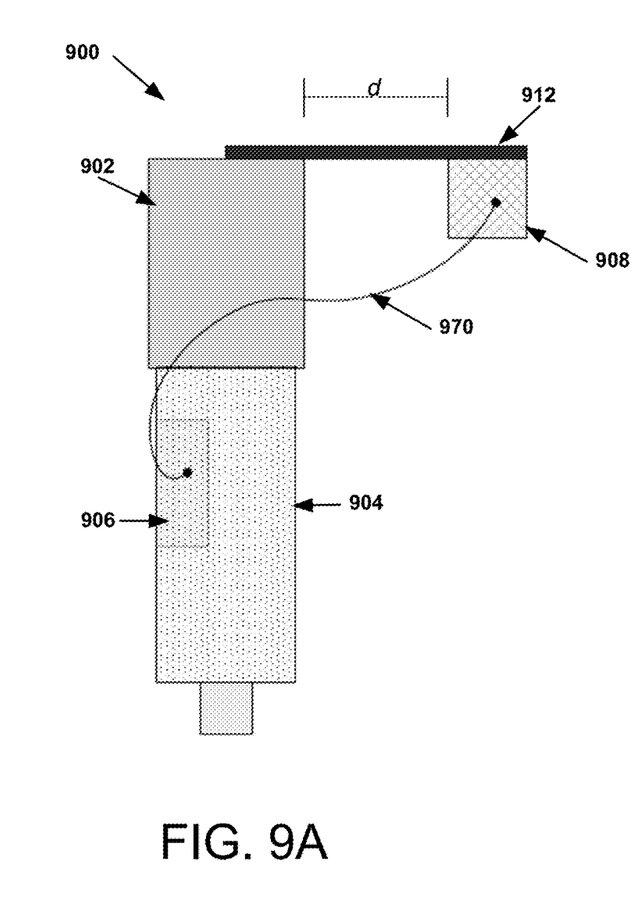
FIGS. 9A-9B depict two example busway systems where the light source is separated from the electrical busway section.
Figure 9B:
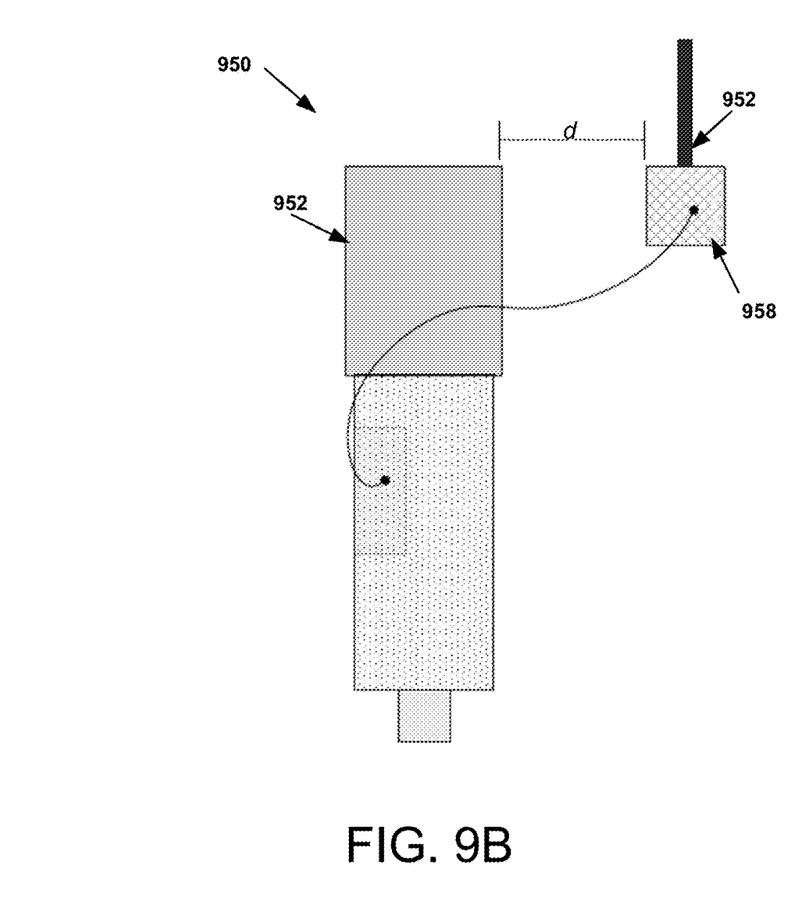

FIGS. 9A-9B illustrates two example busway systems where the light source is separated from the busway by a distance d. FIG. 9A illustrates a busway system 900. The components of the system 900 are similar to the components of the system 100 in FIG. 1B. The system 900 includes an electrical busway section 902, a light source 908, and a plugin module 904. The light source 908 is mechanically coupled to the busway 902 (or its support system—not shown) by a mounting bracket 912. The light source 908 is electrically coupled to the plugin module 904 through the electrical connector 970 and is regulated by a driver 906.

FIG. 9B illustrates a busway system 950. The components of the system 950 are similar to the components of the system 900 in FIG. 9A. The difference between the systems 900 and 950 is that in system 900 the light source 908 is coupled to the electrical busway section 902 by the mounting bracket 912, while in system 950 the light source 958 is separated from and not coupled to the electrical busway section 952; rather, the light source 958 is mounted on an independent support structure (e.g., a system of strut channel and threaded rod) by the mounting bracket 952. Similar to the system 900, the light source 958 is electrically coupled to a plugin module and a driver.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A busway system, comprising:
   an electrical busway section having a length, the electrical busway section having a first side and a second side opposing the first side, the electrical busway section including one or more busbars between the first side and the second side, and extending along the length of the electrical busway section;
   a plugin module including a plug head, wherein the plug head is configured to be received within the one or more busbars to couple the plugin module with the electrical busway section;
   a driver module coupled within or to the plugin module;
   a light source coupled to the electrical busway section and electrically regulated by the driver module; and
   an electrical load electrically coupled to the electrical busway section, wherein the electrical load comprises at least one of a computing system or a manufacturing machine that is electrically powered through the electrical busway section.

2. The system of claim 1, wherein the light source is coupled to the electrical busway section along the first side and extending along the length of the electrical busway section.

3. The system of claim 1, wherein the light source is coupled to the electrical busway section by one or more mounting brackets such that the light source is separated from the electrical busway section by a distance d.

4. The system of claim 3, wherein the light source is suspended below the electrical busway section.

5. The busway system of claim 1, further comprising a sensor coupled to the plugin module to adjust a state of the light source.

6. The busway system of claim 1, further comprising a secondary power supply coupled to the plugin module.

7. The busway system of claim 1, further comprising a bracket providing coupling between the light source and the electrical busway section.

8. The busway system of claim 1, further comprising:
an additional electrical busway section having an additional length,
wherein the light source is coupled to the additional electrical busway section along a side of the additional electrical busway section that coincides with the first side of the electrical busway section and extends along the additional length of the additional electrical busway section.

9. The busway system of claim 1, wherein the light source is a LED light source, and the driver module is a LED driver module.

10. The busway system of claim 1, wherein the plugin module is a first plugin module, and the busway system further comprises a second plugin module separate from the first plugin module, wherein the electrical load is electrically coupled to the electrical busway section through the second plugin module.

11. The busway system of claim 5, wherein the sensor is selected from the group of sensors consisting of: a motion-sensitive sensor, an ultrasound-sensitive sensor, and a temperature-sensitive sensor.

12. A busway system, comprising:
a first busway electrical section and a second electrical busway section each having a length, the first and the second electrical busway sections having a first side and a second side opposing the first side, each section of the first and the second electrical busway sections including one or more busbars between the first and second sides and extending along the length of the section;
a plugin module including a plug head, the plug head being received within the one or more busbars of the first electrical busway section to couple the plugin module with the first and the second electrical busway sections;
a driver module coupled to the plugin module;
a light source coupled to the first and the second electrical busway sections along the first side and extending along at least a portion of the lengths of the first and the second electrical busway sections, and being electrically regulated by the driver module; and
an electrical load comprising at least one of a computing system or a manufacturing machine, the electrical load being electrically coupled to at least one of the first or the second electrical busway section.

13. The busway system of claim 12, further comprising brackets mounted to each of the first and the second electrical busway sections, the brackets providing coupling between the first and the second electrical busway sections and the light source.

14. The busway system of claim 12, wherein the light source is a LED light source, and the driver module is a LED driver module.

15. The busway system of claim 12, further comprising a sensor coupled to the plugin module to adjust a state of the light source.

16. The busway system of claim 12, further comprising a secondary power supply coupled to the plugin module.

17. A busway system, comprising:
an electrical busway section having a length, the electrical busway section having a first side and a second side opposing the first side, the electrical busway section including one or more busbars between the first and the second sides and extending along the length of the electrical busway section;
a plugin module including a plug head, the plug head being received within the one or more busbars to couple the plugin module with the electrical busway section;
a LED driver module coupled to the plugin module;
a LED light source coupled to the electrical busway, and being electrically regulated by the LED driver module;
a sensor coupled to the plugin module to adjust a state of the LED light source; and
an electrical load electrically coupled to the electrical busway section, wherein the electrical load comprises at least one of a computing system or a manufacturing machine that is electrically powered through the electrical busway section.

18. The busway system of claim 17, further comprising:
an additional electrical busway section having an additional length,
wherein the LED light source is additionally coupled to the additional electrical busway section along a side of the additional electrical busway section that coincides with the first side of the electrical busway section and extends along the additional length of the additional electrical busway section.

19. The busway system of claim 17, wherein the LED light source is coupled to the electrical busway section along the first side and extending along the length of the electrical busway section.

20. The busway system of claim 17, further comprising a secondary power supply coupled to the plugin module.

* * * * *